V. A. FYNN.
ALTERNATING CURRENT MOTOR.
APPLICATION FILED MAY 8, 1909.
967,362.
Patented Aug. 16, 1910.
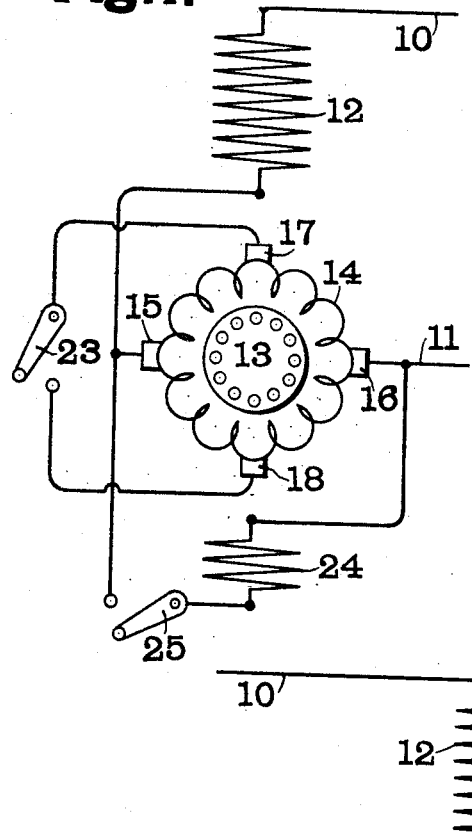
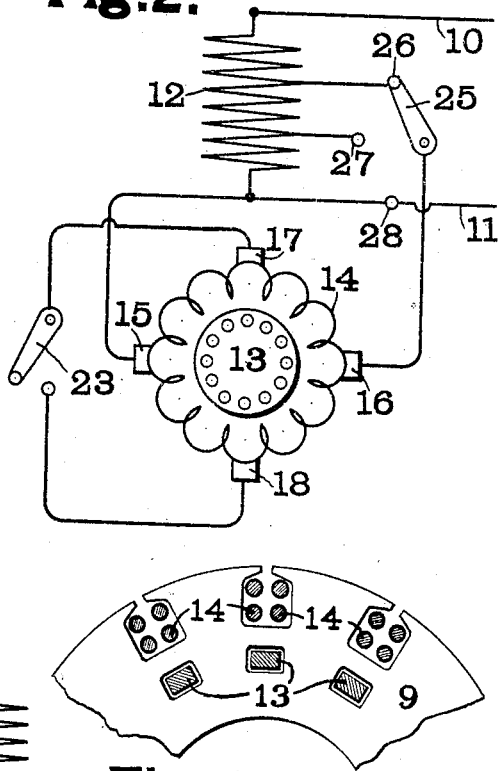
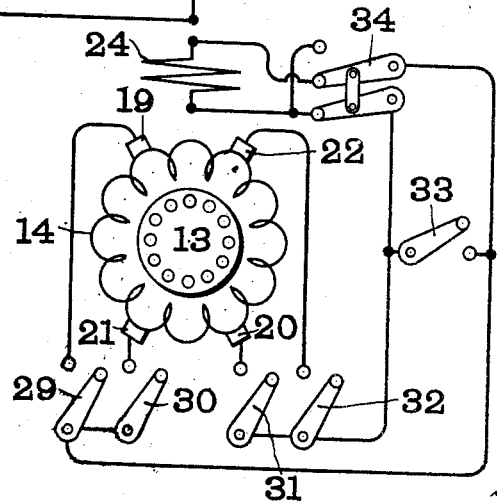
Witnesses
L. L. Mead.
W. H. Alexander
Inventor
Valère A. Fynn
By his Attorneys
Fowler & Huffman

UNITED STATES PATENT OFFICE.

VALÈRE ALFRED FYNN, OF LONDON, ENGLAND.

ALTERNATING-CURRENT MOTOR.

967,362.  Specification of Letters Patent.  Patented Aug. 16, 1910.

Application filed May 8, 1909. Serial No. 494,905.

REISSUED

*To all whom it may concern:*

Be it known that I, VALÈRE ALFRED FYNN, a subject of the King of England, residing at London, England, have invented a certain new and useful Alternating-Current Motor, of which the following is a such a full, clear, and exact description as will enable any one skilled in the art to which it appertains to make and use the same, reference being had to the accompanying drawings, forming part of this specification.

My invention relates to that type of alternate current motor which carries on its induced member an outer commuted winding and an inner winding closed on itself, the former being situated in slots placed near the air-gap, the latter being disposed in other slots separated from the outer slots by a certain amount of magnetic material. The said motors are mostly built for use on single-phase circuits. As long as the motor speed is considerably below synchronism the winding closed on itself takes a heavy lagging current which is of course reflected in the primary and which lowers the efficiency and power factor of the motor. At synchronism the operation of the motor only depends on the commuted winding and much of the rotor copper is idle. Above synchronism the winding closed on itself opposes the action of the commuted winding and reduces the efficiency without being able to sufficiently and positively limit the speed of the machine owing to the magnetic pathway or shunt existing between the inner and outer slots in the rotor. At all speeds the current required by the commuted winding for the production of a suitable motor field is increased by the presence of the winding closed on itself. The result of all this is that the motor speed is not constant and that the actions of the two rotor windings are antagonistic over a great range of the motor load. The winding closed on itself tends to give the motor a shunt characteristic whereas the commuted winding generally tends to give it a series characteristic.

It is the object of my invention to provide means whereby the speed of such machines can be positively limited, whereby both rotor windings may be made to act throughout in unison instead of in opposition and whereby the best possible use is made of all the rotor copper.

Broadly speaking I achieve my objects by providing means whereby, after a certain speed has been reached, the tendency of the commuted winding to give the motor a series characteristic is destroyed and converted into a tendency to give it a shunt characteristic with a normal working speed closely approximating to the synchronous. I can still further improve these machines by combining therewith one of the two phase-compensating devices disclosed by me in my Patent No. 777,198, and which consists in including in the exciting circuit of the commuted winding an E. M. F. practically in phase with that of the supply.

In the accompanying diagrammatic drawings, which show several two-pole embodiments of my invention, Figure 1 is a motor of the said type adapted to be started as a series conduction or induction machine, Fig. 2 is a motor adapted to be started as a shunt conduction machine, and Fig. 3 is a machine adapted to be started as a series induction motor. Fig. 4 shows the position of the windings in the rotor.

Referring to Fig. 1 which discloses the starting connections in one form of my improved motor, the main stator inducing winding 12 is connected in series relation with the commuted winding 14 by way of the brushes 15, 16 and across the mains 10, 11. The rotor winding closed on itself is shown at 13 and is by way of example supposed to be of the squirrel-cage type. The machine starts something like a series conduction motor, although not entirely so, owing to the presence of 13, and the commuted winding generally tends to raise the speed beyond the synchronous. As soon as a sufficient speed has been reached I close switches 23 and 25. As soon as this is done the commuted winding tends to give the machine a shunt instead of a series characteristic thus eliminating all antagonistic action from the motor, increasing its efficiency and its capacity, definitely limiting its speed and also limiting its speed variation under load. In Fig. 1 the circuit of the brushes 15, 16 is closed over a compensating winding 24 here disposed on the stator, this arrangement increases the power factor of the motor and also improves its general operation. This compensating E. M. F. can be derived from any convenient source and need not be taken from a motor winding as shown in Fig. 1. In a modification I could directly short-circuit the brushes 15, 16 after a sufficient speed has been reached, thus securing all the advantages I have enumerated except those contingent on the use of a compensating E. M. F. This motor can also be started something like a series induction machine, for this purpose the brushes 17, 18 should be short-circuited at starting thus simplifying the switching operations. When up to speed the commuted winding is closed along another axis with or without the inclusion of a compensating E. M. F. In order to reverse the direction of rotation in either of the cases just described it is necessary either to reverse the current through 12 or through 14 adjusting the compensating feature to suit.

Fig. 2 shows a machine which starts something like a shunt conduction motor, although not entirely so owing to the presence of 13. The commuted winding may tend to drive the motor beyond synchronism or keep it below that speed according to the proportions chosen. The switches are shown in the starting position, 12 is directly connected to the mains 10, 11 and an E. M. F. of about the same phase as that of the supply is impressed on the commuted winding 14 by way of the brushes 15, 16 and in parallel with 12. The E. M. F. impressed on 14 is by way of example derived from 12 itself at point 26. When the motor has reached a sufficient speed switch 23 is closed and switch 25 moved on to point 27 or 28. Point 27 may be so chosen as to derive from 12 the desired compensating E. M. F. If 25 stands on 28 then the compensating feature is cut out, but the improved motor still retains the other advantages I have previously enumerated. In order to reverse the direction of rotation it is necessary either to reverse the current through 12 or through 14 adjusting the compensating feature to suit.

Fig. 3 shows a machine which starts something like a series induction motor although not entirely so owing to the presence of 13. The commuted winding generally tends to drive the motor beyond its synchronous speed. The switches are all shown open and 12 alone is directly connected to the mains 10, 11. In order to start the motor say in a clockwise direction switches 30 and 32 are closed together with switch 33. If the motor is to be started in the opposite direction then switches 29, 31 and 33 must be closed. Instead of closing 33 it is also possible at starting to close the reversing switch 34 in the one or the other direction, and according to this direction the starting torque will be either increased or decreased by the inclusion of 24 in the brush circuit. Supposing switches 30, 32 and 33 have been closed at starting then as soon as the motor has reached a sufficient speed switches 29 and 31 must also be closed thus eliminating all antagonistic actions from the motor. If it be desired to compensate the machine then switch 33 must be opened and 34 closed in the correct direction.

Having fully described my invention, what I claim as new and desire to secure by Letters Patent of the United States is:

1. In an alternating current motor, the combination with a stator provided with a main inducing winding, of a rotor provided with a commuted winding and a second winding closed on itself, a magnetic shunt forming a pathway for magnetic flux to link with said commuted winding without linking with said second winding, and means for directing the flow of current in said commuted winding along two axes.

2. In an alternating current motor, the combination with a stator provided with a main inducing winding, of a rotor provided with a commuted winding and a second winding closed on itself, said second winding being embedded in the rotor core and separated from the commuted winding by sufficient magnetic material to form a pathway for magnetic flux to pass through said commuted winding without penetrating said second winding, said commuted winding being closed by way of brushes along two axes.

3. In an alternating current motor, the combination with a stator provided with a main inducing winding, of a rotor provided with a commuted winding and a second winding closed on itself, said second winding being embedded in the rotor core and separated from the commuted winding by sufficient magnetic material to form a pathway for magnetic flux to pass through said commuted winding without penetrating said second winding, said commuted winding being closed by way of brushes along two axes, one of which approximately coincides with the axis of the main inducing winding.

4. In an alternating current motor, the combination with a stator provided with a main inducing winding, of a rotor provided with a commuted winding and a second winding closed on itself, said second winding being embedded in the rotor core and separated from the commuted winding by sufficient magnetic material to form a pathway for magnetic flux to pass through said commuted winding without penetrating said second winding, said commuted winding being short-circuited along one axis, and means for impressing a compensating E. M. F. on said commuted winding along another axis.

5. In an alternating current motor, the combination with a stator provided with a main inducing winding, of a rotor provided with a commuted winding and a second winding closed on itself, said second winding being embedded in the rotor core and separated from the commuted winding by sufficient magnetic material to form a pathway for magnetic flux to pass through said commuted winding without penetrating said second winding, and means for closing the circuit of said commuted winding along two axes when the motor has reached any desired speed.

In testimony whereof I have hereunto set my hand and affixed my seal in the presence of the two subscribing witnesses.

VALÈRE ALFRED FYNN. [L. S.]

Witnesses:
W. S. THOMAS,
H. H. TWINGLEY.